United States Patent [19]
Hultsch

[11] 3,812,773
[45] May 28, 1974

[54] COFFEE MAKING MACHINE WITH GRINDING DEVICE AND CENTRIFUGE DRUM

[76] Inventor: Gunther Hultsch, Max-Wonner-Str. 31, 8 Munchen 50, Germany

[22] Filed: Aug. 10, 1972

[21] Appl. No.: 279,717

[30] Foreign Application Priority Data
Oct. 19, 1971 Germany............................ 2151921
Oct. 19, 1971 Germany............................ 2151920
Nov. 23, 1971 Germany............................ 2157894
Mar. 4, 1971 Germany............................ 2116339

[52] U.S. Cl.................................. 99/290, 99/302 C
[51] Int. Cl............................................ A47j 31/00
[58] Field of Search............ 99/286, 290, 287, 302 C

[56] References Cited
UNITED STATES PATENTS
1,789,334  1/1931  Englung................................ 99/286
2,422,944  6/1947  Bogoslowsky........................ 99/286
2,562,560  7/1951  Macartney............................ 99/286
3,107,600  10/1963 Buisson................................ 99/286

Primary Examiner—Robert W. Jenkins
Attorney, Agent, or Firm—Melvin A. Crosby

[57] ABSTRACT

A coffee maker having a grinding mill and an extraction basket in coaxial relation in which the extraction basket includes a cylindrical perforated region. The coffee ground in the mill is supplied to the basket and, thereafter, when hot water is supplied to the basket and the basket is rotated the ground coffee forms a layer about the cylindrical perforated region and the hot water passes radially therethrough while simultaneously forming a coffee beverage.

24 Claims, 8 Drawing Figures

Fig. 5
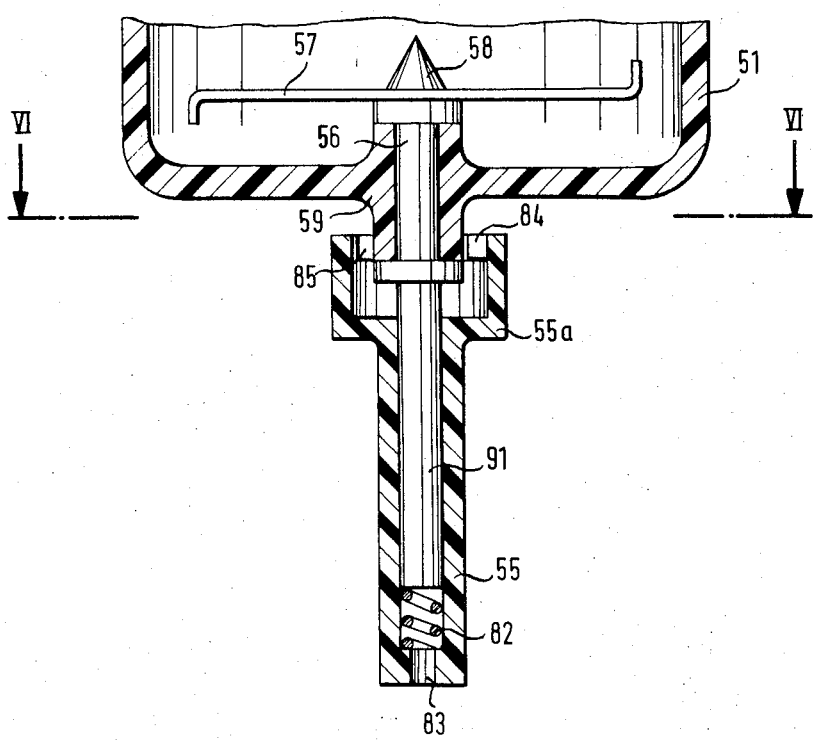
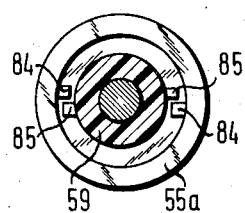
Fig. 6

Fig. 7
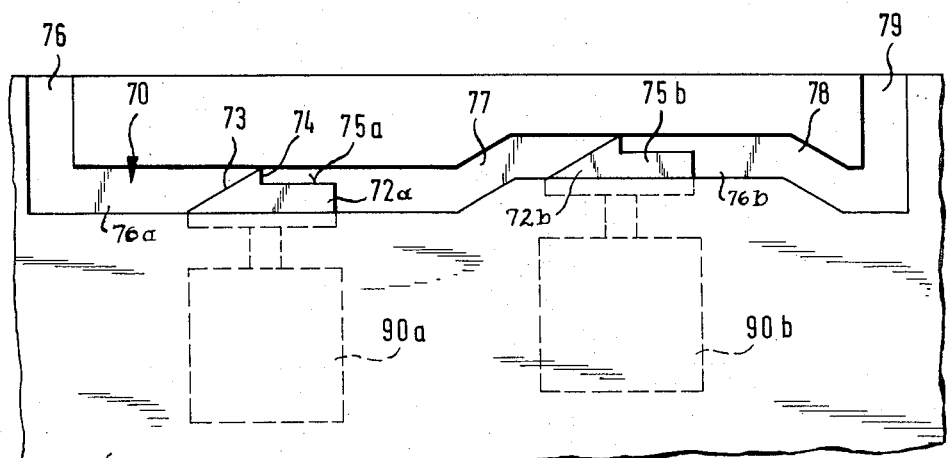
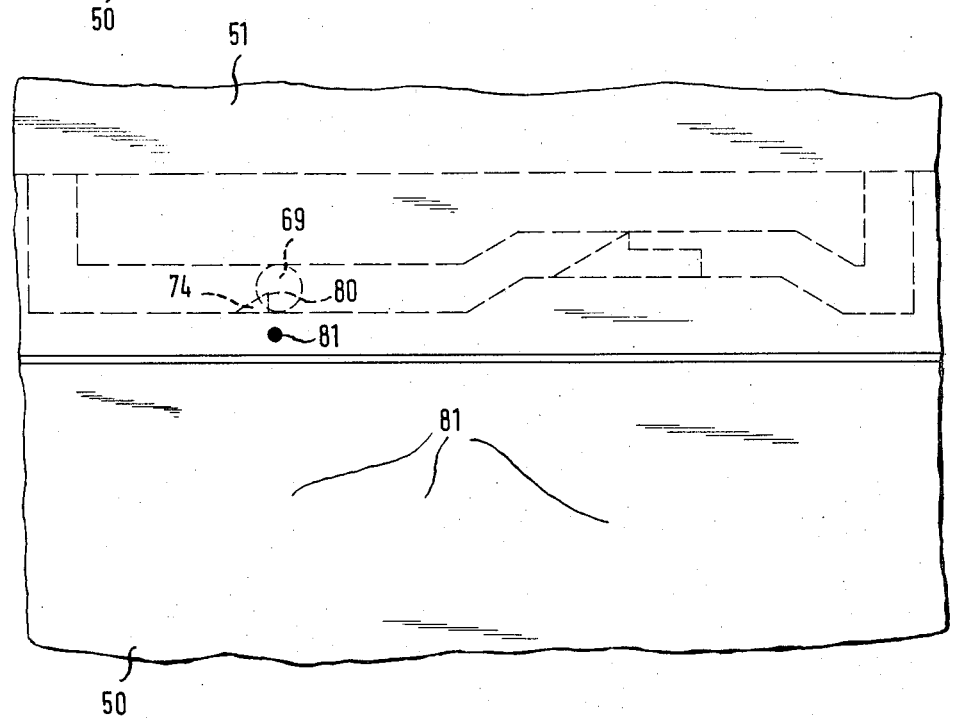
Fig. 8

COFFEE MAKING MACHINE WITH GRINDING DEVICE AND CENTRIFUGE DRUM

The present invention relates to a coffee making machine and is particularly concerned with a coffee making machine in which a coffee bean grinding device is combined with an extracting means.

The usual device in which coffee is made calls for the introduction of ground coffee and water. This sort of arrangement requires that the coffee be ground before it is introduced into the coffee maker. Coffee making devices are known, however, in which a grinding mill is included within the device so that what is placed in the device are coffee beans and water.

One such device is shown in the French Pat. No. 1,117,198 which discloses a mill in which the bottom of the mill is perforated to form a filter so that after the coffee beans are ground in the mill, the water is poured into the mill and passes through the ground coffee and then through the filter bottom. A disadvantage of this arrangement is that the parts of the mill are subjected to hot water and cleaning of the device can be somewhat difficult.

There is also disclosed a coffee making device with a grinding mill incorporated therein in the U.S. Pat. No. 1,789,334. This device has a stationary outer jacket within which are stationary and rotating beater or grinding arms and coaxial therewith is a sedimentation centrifuge or drum or extractor basket which receives the ground coffee.

The moveable beater arms rotate with the extractor basket and in the bottom of the device is a container for hot water from which water is pumped upwardly and then sprayed into the inside of the extractor basket. The extractor basket is arranged to discharge the hot water over the top to return the water back to the hot water container and from which container the brewed coffee is withdrawn. The device disclosed in the aforesaid United States patent may circulate the water several times through the extractor basket to effect the desired degree of extraction from the ground coffee beans.

The device of the patent referred to has the particular drawback that the extraction time is too short for efficient extraction of the ground coffee because the ground coffee particles tend quickly to settle out in the extractor basket under the influence of centrifugal force and the hot water does not stream through the ground coffee but passes thereover.

The actual time of contact of the water with the ground coffee in a device of the nature referred to above may amount to only a fraction of a second. For example, the static sedimentation rate of ground coffee in water may vary from about 0.05 to about 5.0 millimeters per second. Inside a rotating centrifuge drum or extractor basket the sedimentation rate could be up to 500 times greater than that referred to, namely, on the order of about 5.0 up to 500 millimeters per second. With a sedimentation path of about 5 millimeters through which a particle of ground coffee travels, the extraction time during which a coffee particle may be in contact with hot water may be about as little as 1/20 of a second. This length of time is not at all sufficient for effective extraction.

Furthermore, in the machine of the above referred to United States patent, a hot water container is disposed beneath the extractor basket so that steam continuously rises in the device and wets the parts of the grinder and this can create cleaning problems as well as bringing about rather solid compaction of the ground coffee in the extractor basket. The cleaning of the device is thus difficult and time consuming.

Also, since the hot water container contains a heating element, the quality of the coffee beverage is influenced adversely and the location of the hot water container makes it difficult to gain access thereto for cleaning.

With the foregoing in mind, the present invention proposes the construction of a coffee maker containing a grinder, or mill, in which the difficulties referred to above are eliminated.

Still another object is the provision of a coffee maker containing a grinder, or mill, in which the grinder remains substantially dry whereby the coffee maker can be cleaned easily and rapidly.

Still another object is the provision of a coffee maker incorporating a grinding device, or mill, in which extraction of the ground coffee is highly efficient but wherein the extraction is carried out rapidly.

Still another object is the provision of a coffee maker incorporating a grinder wherein the coffee beverage obtained by extracting the ground coffee does not come into contact with a heating element and wherein the coffee beverage is not again returned into the supply of water effecting the extraction.

The foregoing objects as well as still other objects and advantages of the present invention will become more apparent upon reference to the following detailed specification taken in connection with the accompanying drawings in which:

FIG. 5 is a fragmentary sectional view showing a coupling for connection of the extractor basket of FIG. 4 to the drive shaft of the drive motor.

FIG. 6 is a plan sectional view indicated by line VI—VI on FIG. 5.

FIG. 7 is a developed view showing a cam track and switches associated with followers adjacent the cam track to control the operation of the machine.

FIG. 8 is a view like FIG. 7 but showing the various switching positions.

BRIEF SUMMARY OF THE INVENTION

Figure 1:
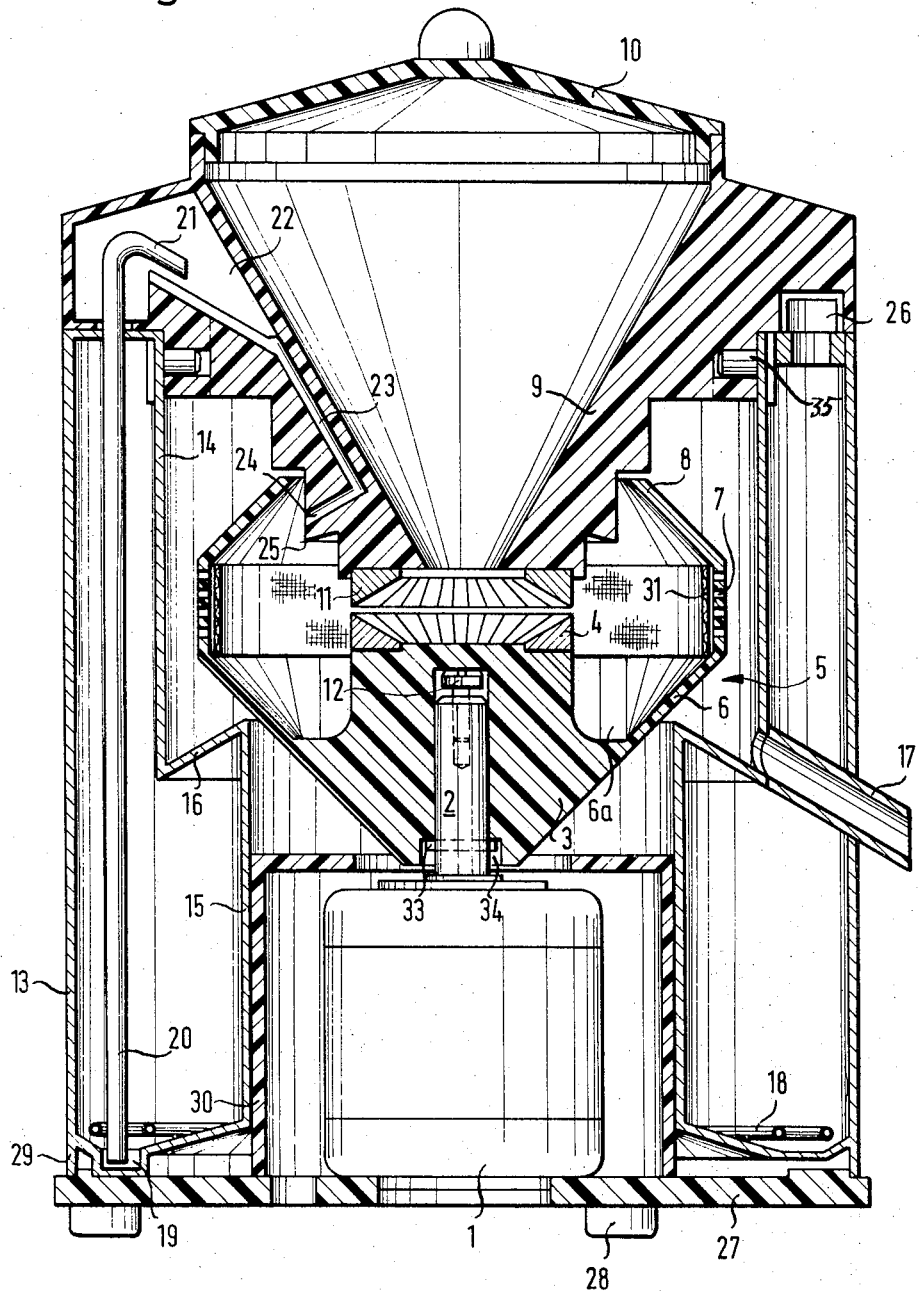
FIG. 1 is a vertical sectional view through a coffee making device according to the present invention and embodying a grinder, or mill, therein.

The coffee making device according to the present invention incorporates a grinder, or mill, to which coffee beans are supplied to be ground thereby and which ground coffee deposits about the inside of a rotary extractor basket or centrifuge drum. The device also includes a hot water supply and which hot water is supplied to the extractor drum to flow radially through the layer of ground coffee therein which effects extraction of the ground coffee to form a coffee beverage and which beverage is then withdrawn from the device through a dispensing outlet.

The extractor basket includes perforations so that the hot water can flow radially through the ground coffee layer therein and may, furthermore, include filter means through which the extracted beverage flows. The extractor basket rotates during the extraction and the water and ground coffee are thus in engagement under pressure so that a thorough extraction is accomplished within a relatively short period of time. Furthermore, the surface of the extractor basket on which the ground coffee deposits is relatively large and this improves the efficiency of the extraction.

In one form of the invention, a disc mill is provided coaxially arranged inside the extractor basket and a filling hopper is provided for supplying unground coffee beans to the inside of the disc mill. The extractor basket is connected to the rotatable disc of the disc mill and rotates therewith and the ground coffee particles leaving the disc mill in the radial direction will form an annular layer inside the surrounding extractor basket. The basket is perforated and hot water fed into the basket passes through the layer of ground coffee and then radially outwardly to an annular collection space outside the basket and is drawn therefrom as completed coffee.

In one modification, an annular water container is provided at the bottom of the device which surrounds the motor which drives the mill and a pipe runs upwardly from the container and supplies water into the extractor basket radially outwardly from the mill. The water in the container, may be heated by an electric heater and, by closing the container, the water can be forced upwardly through the aforementioned pipe by the pressure developed in the upper part of the container by the steam. The completed coffee is continuously withdrawn from the coffee maker so that the coffee does not return to the hot water container and does not come into contact with the electric heating element in the container.

Time switches, and time delay means can be provided to control the operation of the coffee maker and temperature sensitive devices such as thermocouples can also be employed for controlling the operation of the coffee maker.

It is advantageous to mount the extractor basket and the rotatable disc of the disc grinder together on the driving shaft of a motor and this results in a relatively simple construction of the device.

In one modification, the hot water passes radially outwardly through the ring of ground coffee in the extractor basket but in another modification the extractor basket is so constructed that the hot water is supplied to the outside of the annular ring of ground coffee and flows radially inwardly therethrough.

In still another modification of the invention, the grinding device takes the form of a beater rotatable inside the extractor basket and the extractor basket is held stationary during grinding of the coffee and is thereafter caused to rotate with the beater during extraction of the coffee. In any of the modifications, the hot water may be derived from a container incorporated in the device, or it may be supplied to the device from another source.

In one modification, the coffee maker is divided into an upper part and a lower part with the upper part angularly adjustable, or rotatable on the lower part and with cooperating elements of switching devices mounted on said portions so that by angularly adjusting the upper part on the lower part, the coffee maker can be controlled to carry out the sequential steps required during a coffee making operation.

For example, the upper part of the coffee maker can be turned on the lower part to a first switching position wherein only the grinding of the coffee beans is accomplished. In the next position to which the upper part of the coffee maker is turned on the lower part, the grinding device is turned off so that hot water can be introduced into the extractor basket and the extraction of the now ground coffee commenced. In the next position into which the upper portion is on the lower part turned, the extractor basket is caused to rotate, for example, by switching on the driving motor and, at this time, the rotatable grinding member and the extractor basket rotate in unison. In this last mentioned rotated position of the upper part of the device, the hot water is caused to flow through the ground coffee so that the extraction of the ground coffee occurs and the coffee beverage can be controlled.

The turning of the upper part of the coffee maker on the lower part can be accomplished manually with the several positions into which the upper part is turned on the lower part being indicated by indicia. However, any switching which is accomplished by rotation of the upper part of the device on the lower part can also be accomplished automatically, for example, under the control of an electric timer or the like.

DETAILED DESCRIPTION OF THE INVENTION

Referring to the drawings somewhat more in detail, and with particular reference to FIG. 1, the device incorporates a drive motor 1 which is advantageously disposed with the drive shaft 2 vertical and projecting upwardly. The drive shaft has mounted thereon a rather large hub 3 which carries at the top and in the center, and coaxially arranged with the axis of shaft 2, a rotary grinding disc 4. The hub 3 also incorporates an extractor basket or centrifugal drum generally indicated at 5 and which consists of a conical lower part 6 extending upwardly and outwardly from the bottom of hub 3. At the upper outer extremity of part 6 is a cylindrical perforated portion 7. Extending upwardly and inwardly from the upper end of perforated cylindrical portion is an imperforate annular rim 8.

Annular rim 8 surrounds the lower part of a hopper 9 which has a conical filling space therein and which, at the top, is closed by a lid 10. At the bottom, hopper 9 carries a stationary grinding disc 11 arranged in opposed coaxial relation to rotatable grinding disc 4.

The upper end of shaft 2 has threaded therein an abutment screw or bolt 12 on which hub 3 rests for adjustment of the axial relationship of grinding discs 4 and 11. At the bottom, hub 3 has an axial slot 34 and received therein is a pin 33 extending transversely through shaft 2 and effecting driving connection of the shaft with the hub.

The device comprises a cylindrical outer jacket 13 and, in radially spaced relation thereto on the inside and surrounding extractor basket 5, is an inner jacket 14. The bottom of inner jacket 14 is disposed below cylindrical perforated portion 7 of the extractor basket and is connected to an upwardly and inwardly inclined portion 16 at the inner end of which is connected a further cylindrical portion 15 extending downwardly and, at the bottom, joining outer jacket 13.

The annular region immediately above inclined portion 16 forms a collection region into which the extracted coffee is received and from which region there leads the discharge spout 17.

An electric heating coil 18 is disposed in the bottom of the hot water container formed by jacket 13 and 14 and portions 15 and 16 and a recess 19 is provided in the bottom wall of the container into which extends the lower end of a pipe 20. The upper end of pipe 20 is bent over as indicated at 21 so as to discharge water into a space 22 formed in hopper 9 and which communicates by way of passage 23 with an orifice 24 for discharging water into the extractor basket radially outwardly from the disc grinder made up of discs 4 and 11. A dripping edge 25 is provided beneath orifice 24 so that water does not tend to run down the outside of the hopper into the disc mill.

Water can be introduced into the container through an opening in the op and which is adapted for being closed by a stopper 26.

The hopper is adapted for being removed from the device to expose the interior thereof and can be retained in position in any suitable manner, for example, by the bayonet latch means generally indicated at 35 in FIG. 1.

The device comprises a base plate 27 with supporting feet 28. The base plate may have an upstanding annular ring thereon ngaged by the annular protrusion 29 at the bottom of outer jacket 13 thereby to locate the jacket and the parts connected thereto on the base plate.

The aforementioned drive motor 1 is preferably disposed inside a housing 30 in the device which rests on base plate 27 and fits inside cylindrical jacket 15 forming the radially inner limit of the water container.

As to the aforementioned extractor drum, there may be disposed immediately inside the perforated cylindrical portion 7 thereof, a cylindrical filter element 31 which may be of the throw away type.

It will be noted that the hub is formed with an annular cavity, or gutter, 6a disposed beneath the perforated cylindrical portion 7 and into which cavity ground coffee can be received and extracted by hot water supplied thereto.

In operation, if coffee beans are supplied to hopper 9 and motor 1 is started, the coffee beans will be ground and will fly out radially into the extractor basket. When hot water is then caused to rise in pipe 20 and to be supplied to the extractor basket, as the basket rotates, the water will move radially outwardly through the ground coffee and filter 31 and perforated cylindrical portion 7 into the space inside jacket 14 and the finished coffee will run out through discharge spout 17.

Figure 2:
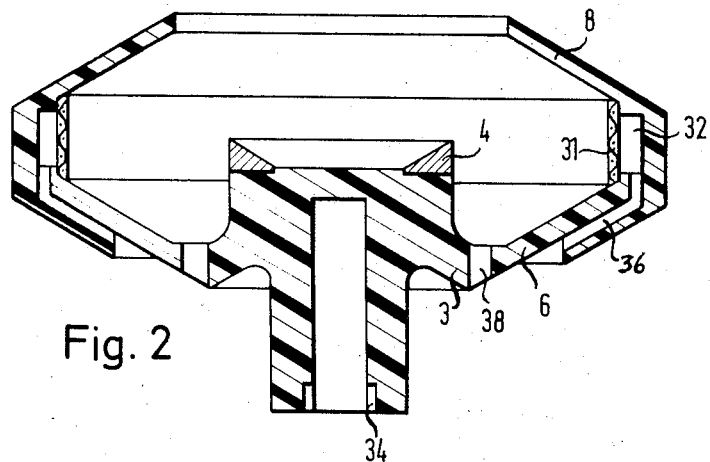
FIG. 2 is a fragmentary view showing a modified construction that can be employed for the extractor basket of the device.

FIG. 2 shows a manner in which the extractor basket could be modified and wherein the filter element 31a is disposed inside an annular space 32 which communicates via bores 33 with the region surrounding the basket. Further bores 38 may be provided in the bottom of the extractor basket. In the case of the modification of FIG. 2 also the receiving chamber for the extracted coffee, and which may be somewhat modified from that shown in FIG. 1, receives all of the liquid discharged from the extractor basket and conveys this liquid directly to a discharge spout.

Figure 3:
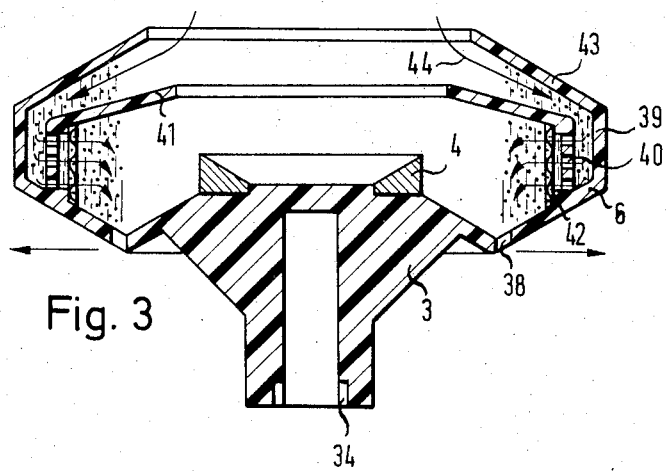
FIG. 3 is a view like FIG. 2 but shows still another form which the extractor basket can take.

In FIG. 3, a modification of the centrifuge drum, or extractor basket, is shown wherein the hot water is supplied, as indicated by arrows 44, into the generally radially extending space between an inner basket portion 41 and an outer basket portion 43. These two portions communicate with an annular space 39 disposed radially outwardly from filter element 31b and communicating therewith via filter element 42 and a perforated axial wall formed in inner basket portion 41. Apertures 38a in the bottom wall of the extractor basket provide openings through which the extracted coffee leaves the basket.

In the arrangement of FIG. 3, the hot water supplied, as shown by arrows 44, moves radially outwardly and into the space 39 and then flows radially inwardly through the ring of ground coffee and then downwardly through apertures 38a to the collection chamber for the completed coffee. In this construction, the time that the hot water spends in engagement with the ground coffee can be controlled to a greater degree than in the two previous modifications because of the fact that the water moves radially inwardly through the ground coffee rather than radially outwardly therethrough.

In the FIG. 3 modification, the radially inwardly directed velocity of the water is selected, by controlling the rate of supply of the water, so as to be smaller than the sedimentation rate at which the coffee particles move radially outwardly so that the particles of ground coffee are not carried out with the coffee beverage.

The modification of FIG. 3 offers the possibility that the machine can readily be cleaned, merely by causing a supply of hot water through the extractor basket at a higher rate of speed than is employed during the coffee making process, or by stopping rotation of the basket and passing hot water therethrough at the end of a coffee making operation.

Figure 4:
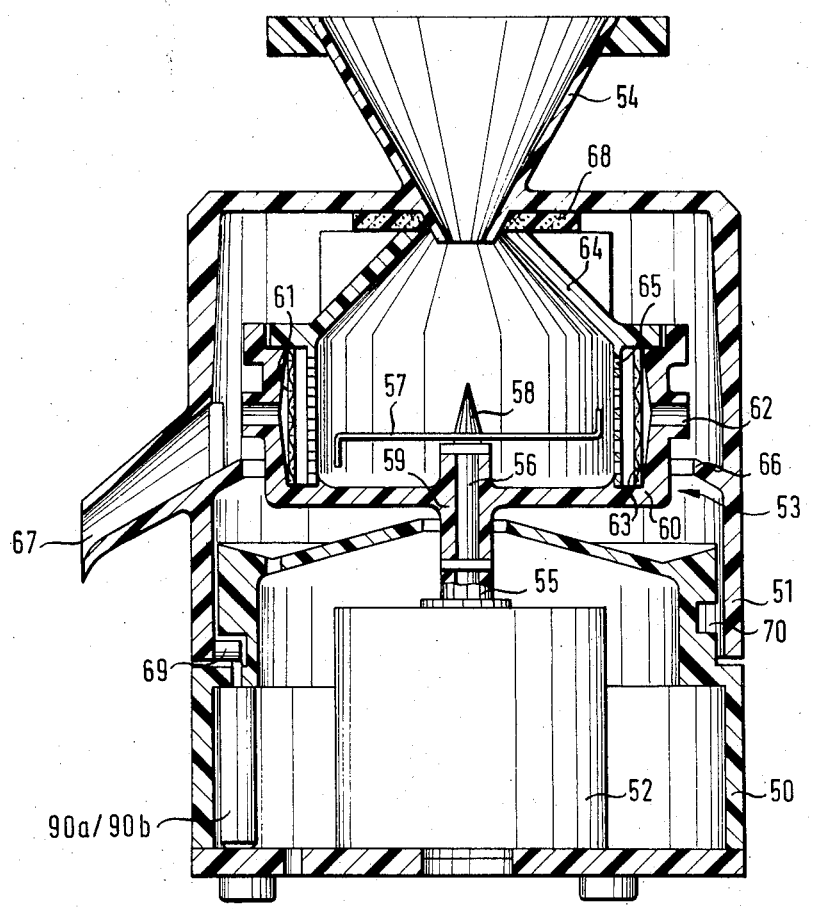
FIG. 4 is a vertical sectional view like FIG. 1 but shows another embodiment of the coffee making machine according to the present invention.

In FIG. 4, an embodiment is illustrated in which the grinding device is constructed as a beater mill.

In the device of FIG. 4, a housing is provided having a stationary lower part 50 and an upper part 51 coaxial with the lower part and angularly adjustable thereon. Mounted in lower part 50 is a drive motor 52 while coaxially arranged with the driving motor and at the top of the device is a hopper 54.

Motor 52 drives an outer shaft 55. An inner shaft 56 is disposed inside shaft 55. At the upper end of shaft 56 is a beater 57 which may be held in place on shaft 56 by conical screw 58.

The shaft 56 extends axially through the hub 59 of the lower part 60 of the extractor basket. Hub 59, as will be seen on reference to FIG. 5, is resiliently supported in hollow shaft 55 for axial movement therein. Part 60 includes an upstanding cylindrial peripheral portion formed with channels 61 which incline toward radial discharge ports 62. The cylindrical portion of the extractor basket also provides support for a cylindrical filter element 63.

Resting on top of cylindrical portion of the extractor basket 60 is a part 64 which tapers inwardly in the upward direction part 64 also has a cylindrical perforated portion 65 disposed inside the cylindrical portion of the extractor basket in radially spaced relation thereto.

The aforementioned portion 64 is so connected to the extractor basket that liquid pressure inside the extractor basket will not separate the parts and so that the parts will rotate together.

The upper portion 51 of the housing is provided with a discharge gutter 66 in which the coffee is collected and with which communicates the discharge spout 67.

Underneath the top wall of the upper portion 51 of the housing is a friction disc 68 which is engageable with the upper end of the part 64 which is mounted on the top of the extractor basket.

The lower part of the upper portion 51 of the housing telescopically engages the upper portion of the lower part thereof and radial bolts 69, which may consist of three circumferentially spaced bolts, on the upper part of the housing engage guide groove means 70 on the lower part of the housing. The groove means 70 consist of a respective groove for each bolt.

As will be seen in FIGS. 4 and 7, limit switch means 90a and 90b are provided carried in the lower part 50 of the housing while respective switch cams 72a, 72b carried by the switches are provided for actuating the switches. The switch cams have leftwardly and upwardly facing inclines 73 on the approach sides and stop lugs or stop surfaces 74, facing rightwardly away from the inclines and dependent from the upper ends of the inclines. The cams also have upwardly facing straight surfaces 75a, 75b, leading rightwardly away from the lower ends of stop surfaces 74.

FIG. 7 will also show that each guide groove means 70 comprises a vertical portion 76 at one end (starting end) which communicates with a horizontal portion 76a at one level. At the end of portions 76a opposite portion 76 is an upward incline 76 that connects with another horizontal portion 76b which is at a higher level than the first mentioned horizontal portion 76a and terminating in a downwardly inclined portion 78 that, at the end, again communicates with another vertical portion 79.

FIG. 8 shows the bolt 69 which cooperates with cams 72a, 72b pertaining to the aforementioned limit switches 90a, 90b, respectively, so aforementioned limit switches 90a, 90b, respectively. Bolt 69 has a notch 80 formed therein so that once the upper portion of the coffee maker has been turned forwardly to the point that the stop lug 74 will engage the notch 80 of bolt 69, the upper portion of the coffee maker cannot be turned in the reverse direction. The notch 80 of bolt 69 receives the stop lug 74 of each of the cams 72a, 72b. Thus, once a coffee making cycle has been started, it must progress through to the finish.

As will be seen in FIG. 5, the hub 59 on the bottom of the extractor basket is rotatable on shaft 56 while the bottom of the hub telescopically engages the upper end of the hollow shaft 55 which is driven by the motor. Shaft 56 at its lowermost end is supported on a compression spring 82 contained in hollow shaft 55 and a small hole 83 at the bottom of shaft 55 prevents any accumulation of foreign material in the space occupied by the spring.

When bolts 69 are in portions 76a of groove means 70, disc 68 is pressed down on the extractor basket and the basket is pressed down against the bias of spring 82 and is held against rotation and the beater can rotate in the basket for a grinding operation. When bolts 69 are in portions 76b of groove means 70, the basket is released and rotates with the beater.

The upper end of shaft 55 may have an enlarged cylindrical end part 55a in which the hub 59 is disposed while cooperating elements of coupling jaws 84 and 85 are formed on the cylindrical portion of the shaft and on the hub. It will be evident that the aforementioned lugs will be disengaged by axially downward movement of the extractor basket and shaft 56 inside the hollow shaft 55 when bolts 69 are in groove portions 76a and will be engaged when bolts 69 are in groove portions 76b. The clutch formed by the lugs thus provides for positive coupling of the basket to the beater.

In the operation of the modification of FIGS. 4 through 8, the bolts 69 of the upper housing part are first introduced into the vertical portions 76 of the guide groove means 70 formed in the lower part of the housing and which are marked by the legend 'START'. The upper part of the housing is pressed down to align bolts 69 with groove portions 76a and the housing is then rotated until the marker 81 on the upper part of the housing aligns with the inscription 'FILL' formed on the lower part of the housing. Coffee beans can now be poured into hopper 54 so that they will drop into the beater mill. The upper housing portion is then turned until guide mark 81 aligns with the inscription 'GRIND' on the lower housing part. When this position is reached, limit switch 90a is actuated and the beater 57 is caused to rotate. The extractor basket is, at this time, held against rotation, and the coffee beans will be ground. Also, the stop lug 74 previously referred to on the switch cam 72a engages the notch 80 in bolt 69 and prevents reverse rotation of the upper part of the housing on the lower part.

After the desired degree of grinding has been carried out, and which may be a timed cycle, the upper part of the housing is rotated until the index mark 81 thereon reaches the legend 'BREW' on the lower housing part and at this time a predetermined amount of hot water can be poured into hopper 54 for preliminary extraction of the ground coffee in the extraction basket. In this position of the upper part of the housing, neither beater 57 nor basket 60 is rotating.

Thereafter, the upper part of the coffee maker is turned until index mark 81 thereon aligns with the legend 'FILTER' on the lower part of the coffee maker. In this position the basket 60 is released because bolts 69 move up inclined portion 78 into portions 76b of groove means 70. Also, switch cam 72b for limit switch 90b is engaged by bolt 69 and the motor is energized to cause the extractor basket to rotate and the desired further amount of hot water is now poured into the hopper 54 and passes radially outwardly through the ground coffee in basket 60 and into gutter 66 and leaves the machine via spout 67.

In respect of coupling jaws, or lugs, 84, and 85, it will be apparent that at the beginning of the cycle the upper part of the coffee maker is pressed downwardly so that the friction disc 68 presses down on top of the extractor basket and moves the extractor basket downwardly to disengage the lugs so that the extractor basket will not rotate during the grinding operation.

However, when the upper part of the device is turned to the point that limit switch 90b is actuated, the upper part of the device is in an elevated position on the lower part and lugs 84 and 85 are engaged while the friction disc 68 no longer frictionally connects part 64 of the extractor basket with housing part 51 so that at this time the extractor basket is driven in rotation and at the same rate of speed as the beater 57.

It is, of course, possible for the extractor basket to be driven in rotation merely by the engagement of the beater 57 with the layer of ground coffee inside the extractor basket in which case the aforementioned jaw clutch arrangement need not be employed. Furthermore, instead of the friction disc 68, a stop cam or lug can be employed for holding the extractor basket stationary during the grinding operation.

Further, the entire upper part of the coffee maker does not need to be rotated but any other form of switching device can be provided if it takes into account that the extractor basket is to be stationary during the grinding operation and is to rotate during the coffee making operation.

Measuring marks or the like can be provided on hopper 54 so that it can serve as a measuring device for the coffee beans and also for the water.

A time switch may be employed to control the grinding operation so that a reliable degree of fineness of the ground coffee can readily be accomplished.

The switching arrangement shown in the drawings embodies mechanically operated limit switches but the switches could also be contactless magnetic switches or switches of other types as well. Any sort of safety device can be employed to avoid accidental actuation of the switches when the two housing parts are separated.

It will be evident that the bolts 69 not only serve as switch actuating elements but also as elements of a bayonet latch to hold the two parts of the housing together during the coffee making operation.

Modifications may be made within the scope of the appended claims.

What is claimed is:

1. In a coffee maker; a frame, a mill for grinding coffee beans and a rotatable extraction basket in coaxial relation in said frame and motor means in the frame for driving said mill and basket, means for supplying coffee beans to said mill to be ground thereby, said basket comprising a perforated cylindrical portion surrounding said mill in radially spaced relation thereto, the ground coffee from said mill being received in said basket, said ground coffee forming an annular layer inside said cylindrical portion when said basket rotates and water is supplied to the basket, means for supplying hot water to said basket, said water flowing radially through the said cylindrical portion of said basket when said basket rotates and said ground coffee forms a layer inside said cylindrical portion of said basket, and collection means adjacent said basket for collecting the liquid which flows radially through said cylindrical portion of said basket and for conveying it out of the coffee maker.

2. A coffee maker according to claim 1 in which said mill is a disc mill and comprises axially spaced opposed discs of which at least one is rotatable, said cylindrical portion of said basket being radially spaced from the gap between said discs, said basket being adapted to rotate with said rotatable disc of said mill.

3. A coffee maker according to claim 1 which includes in said frame a water container in the lower part thereof, a pipe leading upwardly from said container to a level above said basket, passage means leading from the upper end of said pipe downwardly and having an outlet end disposed within the range of said basket, a collection gutter in said frame adjacent said basket to receive coffee beverage therefrom, and a discharge outlet leading from said gutter to the outside of said frame, said gutter and discharge outlet forming said collection means.

4. A coffee maker according to claim 1 in which said frame includes an outer cylindrical wall, a first inner cylindrical wall in the lower part of said frame beneath said basket and connected at the bottom to the bottom of said outer cylindrical wall to form a water container, a second inner cylindrical wall larger in diameter than said first inner cylindrical wall in the upper part of said frame surrounding said basket and at the top connected to the top of said outer cylindrical wall, and an annular wall portion connected to the bottom of said second inner cylindrical wall and to the top of said first inner cylindrical wall and inclining upwardly in the radially inward direction to form an annular gutter, and a discharge passage leading from said gutter outwardly through said outer cylindrical wall to the outside of said frame, said gutter and discharge passage forming said collection means.

5. A coffee maker according to claim 4 which includes a hopper member on top of said frame leading into said mill, said mill comprising a first disc on the bottom of said hopper and a second disc opposed to said first disc and mounted in said basket, an output shaft on said motor means extending upwardly into said basket on the axis thereof, means slidably keying said output shaft to said basket, and means for adjusting the axial position of said basket on said output shaft to adjust the axial spacing between said discs.

6. A coffee maker according to claim 4 which includes means for supplying water to said container and for closing said container, and heating means for heating water in said container to evolve steam and force hot water from said container up said pipe and out the outlet end thereof.

7. A coffee maker according to claim 1 in which said frame includes a water container in the lower part thereof, a pipe leading upwardly from said container to a level above said basket, passage means leading from the upper end of said pipe downwardly and having an outlet end disposed within the range of said basket said collection means comprising, a collection gutter in said frame adjacent said basket to receive coffee beverage therefrom and a discharge outlet leading from said gutter to the outside of said frame, said outlet end of said passage means being disposed radially outwardly from said mill, and a drip rim surrounding said mill and adjacent the outlet end of said passage means to prevent water from getting on said mill.

8. A coffee maker according to claim 1 in which said basket comprises an upwardly opening annular recess therein between said cylindrical portion and said mill and at a lower level than said cylindrical portion to receive ground coffee from said mill and serving as a space to receive hot water for preliminary extraction of ground coffee in the absence of rotation of said basket.

9. A coffee maker according to claim 1 in which said basket includes a lower imperforate conical portion connected to the bottom of said cylindrical portion and tapering inwardly in the downwardly direction and an upper imperforate conical portion connected to the top of said cylindrical portion and tapering inwardly in the upward direction, said lower conical portion forming the hub for said basket, a hopper in the top of said frame opening at the bottom into said mill, the upper end of said upper conical portion being apertured and surrounding the lower end of said hopper, said means for supplying hot water to said basket comprising passage means extending downwardly along the outside of said hopper and having an outlet end disposed below the top of said upper conical portion of said basket.

10. A coffee maker according to claim 1 in which said basket comprises an upwardly opening annular recess therein at a lower level than said cylindrical portion and having axial apertures formed therein at the bottom.

11. A coffee maker according to claim 1 in which said basket comprises an upper conical portion connected to the top of said cylindrical portion and tapering inwardly in the upward direction and a lower cylindrical portion connected to the bottom of said cylindrical portion and tapering inwardly in the downward direction, said cylindrical portion comprising a cylindrical filter element extending between said conical portions, an imperforate cylindrical wall extending between said conical portions radially outwardly from said filter element, and channel means leading from the space between said filter element and said cylindrical wall downwardly and inwardly and terminating in outlet ends disposed radially inwardly from said filter element.

12. A coffee maker according to claim 1 in which said basket has a hub at the bottom and a lower conical portion tapering outwardly in the upward direction and at the top connected to the bottom of said cylindrical portion, said basket having a first upper conical portion connected to the top of said cylindrical portion and tapering inwardly in the upward direction and formed with a central aperture at the top, said basket also comprising an imperforate cylindrical wall disposed radially outwardly from said perforated cylindrical portion and at the bottom connected to the top of said lower conical portion, a second upper conical portion generally parallel to said first upper conical portion and spaced upwardly therefrom and also having a central aperture formed therein at the top and at the bottom connected to the top of said imperforate cylindrical wall, and apertures formed in said lower conical portion and disposed radially inwardly from said perforated cylindrical wall, and radially outwardly from the annular gap between the upper ends of said upper conical portions.

13. A coffee maker according to claim 1 in which said mill comprises a beater element in said basket and coaxial therewith, means for rotating said beater element while said basket is stationary or for rotating said beater element and basket together said collection means comprising, an annular collection gutter in said frame surrounding said basket to receive coffee beverage leaving said basket in the radially outward direction, and a discharge channel extending from said gutter to the outside of said frame.

14. A coffee maker according to claim 13 in which said beater element comprises a drive shaft extending downwardly therefrom and nonrotatably engaging the output shaft of said motor means, said basket having a hub at the bottom surrounding said drive shaft, a drive motor having an output shaft coupled to said drive shaft of said beater element, and means in the frame for holding said basket against rotation during rotation of said beater element.

15. A coffee maker according to claim 14 in which said basket comprises a lower part having said hub thereon and also including said perforated cylindrical portion, said basket also comprising an upper portion engaging the top of said cylindrical portion, and cooperating elements of brake means on said frame and said upper portion of said basket selectively interengageable to hold said basket stationary during rotation of said beater element for a grinding cycle.

16. A coffee maker according to claim 15 in which said upper portion includes a perforated cylindrical wall inside said basket and spaced radially inwardly from the perforated cylindrical portion of said basket, a cylindrical filter element inside the cylindrical portion of said basket, said cylindrical portion of said basket having radial discharge openings therein, and groove means formed on the inside of said cylindrical portion and leading to said openings.

17. A coffee maker according to claim 14 which includes cooperating elements of clutch means to clutch said basket to said output shaft of said motor means, a spring urging said basket upwardly and toward a position of engagement of said elements, and means to press said basket downwardly against the bias of said spring to disengage said elements.

18. A coffee maker according to claim 1 in which said frame comprises a lower part, said motor means comprising a drive motor in said lower part drivingly connected to said mill and adapted for driving said basket, said frame comprising an upper part which at the bottom detachably telescopically engages said lower part and is rotatable on said lower part, said upper part comprising a hopper leading into said mill said collection means comprising a collection gutter surrounding said basket and a discharge channel leading from said collection gutter to the outside of said upper part, said lower part comprising circumferential groove means near the top and said upper part comprising bolt means receivable in said groove means when said upper part is engaged with said lower part, switch means connected in controlling relation to said drive motor, and switch actuator means for said switch means disposed for actuation in response to rotation of said upper part on said lower part when said parts are in engaged relation.

19. A coffee maker according to claim 8 in which said groove means comprises a vertical entrance region, a first horizontal region having one end connected to the lower end of said entrance region, an inclined region leading upwardly at an angle from the other end of said first horizontal region, a second horizontal region having one end connected to the upper end of said inclined region and an exit region leading vertically upwardly from the other end of said second horizontal region, said switch actuator means comprising a switch actuator adjacent each said horizontal region of said groove means adapted for actuation by said bolt means.

20. A coffee maker according to claim 19 in which each actuator has an inclined ramp for engagement by the bolt means to move the actuator into switch means actuating position and a stop surface at the upper end of the ramp facing away from the ramp and engageable with said bolt means to prevent reverse rotation of said upper part on said lower part.

21. A coffee maker according to claim 20 which includes cooperating elements of basket holding means on said upper part of said frame and said basket which are engaged to hold said basket against rotation when said bolt means engage said first horizontal region of said groove means and which are disengaged to release said basket for rotation when said bolt means engage said second horizontal region of said groove means.

22. A coffee maker according to claim 21 which includes cooperating elements of clutch means on said basket and said mill to couple the basket to the mill for rotation therewith, said elements being disengaged when said bolt means engage said first horizontal region of said groove means and being engaged when said bolt means engage said second horizontal region of said groove means.

23. A coffee maker according to claim 22 in which said mill includes a drive shaft extending downwardly therefrom, said basket having a hub telescopically engaging said drive shaft, and a spring urging said basket in the upward direction toward clutch element engaging position.

24. A coffee maker according to claim 19 which includes a downwardly inclined portion at the said other end of said second horizontal region which terminates at the lower end at about the level of said first horizontal region.

* * * * *